United States Patent
Comer et al.

(10) Patent No.: US 11,799,921 B1
(45) Date of Patent: Oct. 24, 2023

(54) INTELLIGENT CONTENT PRESENTATION IN A MULTI-USER, MULTI-DEVICE, AND/OR MULTI-CONTENT ECOSYSTEM

(71) Applicant: Dell Products L.P., Round Rock, TX (US)

(72) Inventors: Ryan Nicholas Comer, Round Rock, TX (US); Tyler Ryan Cox, Austin, TX (US); Uboho Thomas Victor, San Antonio, TX (US); Erik Summa, Austin, TX (US); Jyoti Jasmine Luu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/063,503

(22) Filed: Dec. 8, 2022

(51) Int. Cl.
*G06F 15/16* (2006.01)
*H04L 65/1089* (2022.01)
*H04L 65/1093* (2022.01)

(52) U.S. Cl.
CPC ...... *H04L 65/1089* (2013.01); *H04L 65/1093* (2013.01)

(58) Field of Classification Search
CPC .................. H04L 65/1089; H04L 65/1093
USPC ........................................................ 709/231
See application file for complete search history.

(56) References Cited

U.S. PATENT DOCUMENTS 10,452,758 B1 * 10/2019 Bhowmick ........... G06F 40/205

OTHER PUBLICATIONS

Chan, Chris "Move your music between rooms with stream transfer", Google Nest, Oct. 8, 2019, https://www.blog.google/products/google-nest/move-your-music-stream-transfer/.

* cited by examiner

*Primary Examiner* — Lan Dai T Truong
(74) *Attorney, Agent, or Firm* — Norton Rose Fulbright US LLP

(57) ABSTRACT

Systems and methods described herein may provide a system that enables determining, for each respective content component of a streaming session, a host device for displaying the respective content component. The system may utilize user, content, and device context to orchestrate content components across all connected displays to maximize the collective user experience across all users in an environment. Inputs may be provided to a machine learning model that considers every possible layout combination of content components on a one or more host devices and outputs potential layouts for the one or more host devices. The potential layouts may be sorted by confidence and one layout selected for each of the one or more host devices.

20 Claims, 11 Drawing Sheets

INTELLIGENT CONTENT PRESENTATION IN A MULTI-USER, MULTI-DEVICE, AND/OR MULTI-CONTENT ECOSYSTEM

FIELD OF THE DISCLOSURE

The instant disclosure relates to information handling systems. More specifically, portions of this disclosure relate to modifying presentation of one or more applications on a display.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Information handling systems may be used to execute applications such as gaming applications, audio/video streaming applications (e.g., Netflix®, YouTube®, etc.), web browser applications, social media applications, etc. Each executed application may be displayed on a device display (e.g., a screen of a computer monitor, TV, phone, tablet, VR headset, etc.). When more than one application is executed on a device simultaneously, each application must be positioned on the device's display, and possibly scaled, such that each application can be viewed. Information handling systems can also enable connecting multiple devices. For example, multiple users on separate devices can interact with an executed application at the same time on their own respective devices. The various devices on which an application could be simultaneously displayed can have different capabilities as well as displays with different sizes and aspect ratios. Additionally, one user device may execute a different combination of applications than a second user device.

Aspects of embodiments of this disclosure involve determining a device for displaying content components (e.g., applications) of a streaming session. For example, a user may be in a room that has a TV, a computer monitor, and a tablet connected to a hub device, and the user may desire to stream a game (e.g., a first content component), a web browser application (e.g., a second content component), and a social media application (e.g., a third content component). In this example, it may be determined whether the TV, the computer monitor, or the tablet will display each of the game, the web browser application, and the social media application. For instance, the TV may display each of the game, the web browser application, and the social media application. In another instance, the TV may display the game and the web browser application, and the tablet may display the social media application.

In another example, a first user and a second user may be in a room with the first user's TV and the second user's tablet. Both the first and second users may desire to stream a game that they will play together while the second user may also desire to stream a social media application. In this example, it may be determined which device will stream each of the first user's game stream, the second user's game stream, and the social media application. For instance, the TV may display the first user's game stream and the second user's game stream, and the tablet may display the social media application.

Aspects of embodiments of this disclosure may involve determining a display layout for content on the determined device. In an example, the user may stream the game, the web browser application, and the social media application on the TV, but then move to continue the session on a computer monitor. A new display layout may be determined for the game, the web browser application, and the social media application when moved to the computer monitor as compared to the display layout on the TV. In some cases, a second user may join and simultaneously interact with the game stream on a tablet. In addition to the game stream, the second user may interact with a content streaming application (e.g., YouTube®). A display layout may be determined for the game stream and content streaming application on the second user's tablet that is different than the display layout on the first user's computer monitor that includes the game, the web browser application, and the social media application.

User, content, and device context may all be considered when a device for displaying content is determined and when a display layout for content is determined for a particular device. For example, user and device location, user preferences, content being consumed on a device (e.g., content type, size, aspect ratio), and device capabilities may each be inputs considered in determining a display layout. The inputs may be provided to a machine learning model that considers every possible layout combination of content components on a one or more devices and outputs potential layouts for the one or more devices. The potential layouts may be sorted by confidence and one layout selected for each of the one or more devices.

In some embodiments, the aspects described herein may be used to support the execution of gaming applications in different environments. Gaming sessions may execute on a service, either locally on a device, on another system on the network, or in the cloud. A device may access the gaming session by executing an application that communicates with the service to receive and transmit user input to the service and provide feedback to the user from the service. The device may include its own audio/visual (AV) output for displaying a graphical user interface and/or a rendered display from the gaming session. Different environments at a location may include different AV systems, and the device may be automatically paired with an AV system and may be reconfigured to support interaction with an application session using the paired AV system.

A user's home is one example location that may have multiple environments, such as a living room, a dining room, a study, and/or a bedroom, each with different screen configurations, speaker configurations, and/or network availability. Aspects of embodiments disclosed herein may provide a system that enables game play from a set of candidate game hosts and environments to consumption devices of a user's choice while the user moves about their home between the different environments. The system may employ methods to determine where a user is located within the home, availability and selection of candidate game hosting and target environments, homing and direction of related I/O, and/or AV for consumption. The system then migrates the user and their information to the determined environment by coordinating gameplay by the user. If the user changes environments mid-game, the system may need to change the display layout based on the new environment's display device, user preferences, etc. The solution accommodates multiple users simultaneously within the home, whether in single player, multiplayer using the same screen, or multiplayer using separate screen games. The solution may configure AV and input/output (I/O) such that multiple users can consume one or multiple games in the home simultaneously, whether in separate locations or when seated together in front of the same consumption device, e.g., a large television, where multiple games might be hosted simultaneously. The system may determine a respective display layout for each user device that is simultaneously consuming the one or multiple games.

The mobility of a user between services and applications for executing an application session may be supported by an information handling system that uses available telemetry from multiple sources to build a confidence-based knowledge graph of the user's gaming environments and determine a position of the user within that graph. A system with knowledge of devices in a user's gaming environment may build a knowledge graph by aggregating and comparing telemetry. For example, network telemetry may reveal that devices are positioned relatively near each other, a mobile device may reveal an absolute location based on GPS data, and/or an infrared presence sensor may reveal that the user is sitting in front a device. An intelligent system may assemble these individual pieces of telemetry into a broader knowledge graph based on the absolute and/or relative locations of the user's devices, the location of the user in relation, and or characteristics of the devices. This knowledge graph may be updated in real time and/or based on changes in device telemetry.

According to one embodiment, a method for execution by an information handling system, such as a hub device, includes detecting, at a hub device, a plurality of content components of a streaming session; detecting, at the hub device, a plurality of users of the streaming session; detecting, at the hub device, a plurality of devices in communication with the hub device, each device having a respective display; determining, at the hub device and using a machine learning algorithm, for each respective content component, a device of the plurality of devices on which to display the respective content component based on the detected plurality of content components, the detected plurality of users, and the detected plurality of devices; and displaying the plurality of content components on the determined devices.

In certain embodiments, a first device displays a first content component and a second content component, and a second device displays the first content component but not the second content component. As such, the method enables displaying different content on different devices in these embodiments.

In certain embodiments, a first device displays a first content component and a second content component, and the method further includes determining a layout of the first and second content components on the display of the first device. As such, the method considers how the content components will be displayed on each device when determining which device(s) to display each content component in these embodiments.

In certain embodiments, a first content component and a second content component are determined to be displayed on the display of a first device, and the first content component is displayed overlapping the second content component. Overlapping one content component over another can free up space on the display when a user is not interacting with both content components at the same time.

In certain embodiments, the method further includes, in response to a user command, swapping the overlapped first and second content components such that the second content component is displayed overlapping the first content component. Swapping the overlapped content components enables a user to interact with the hidden, overlapped content component.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
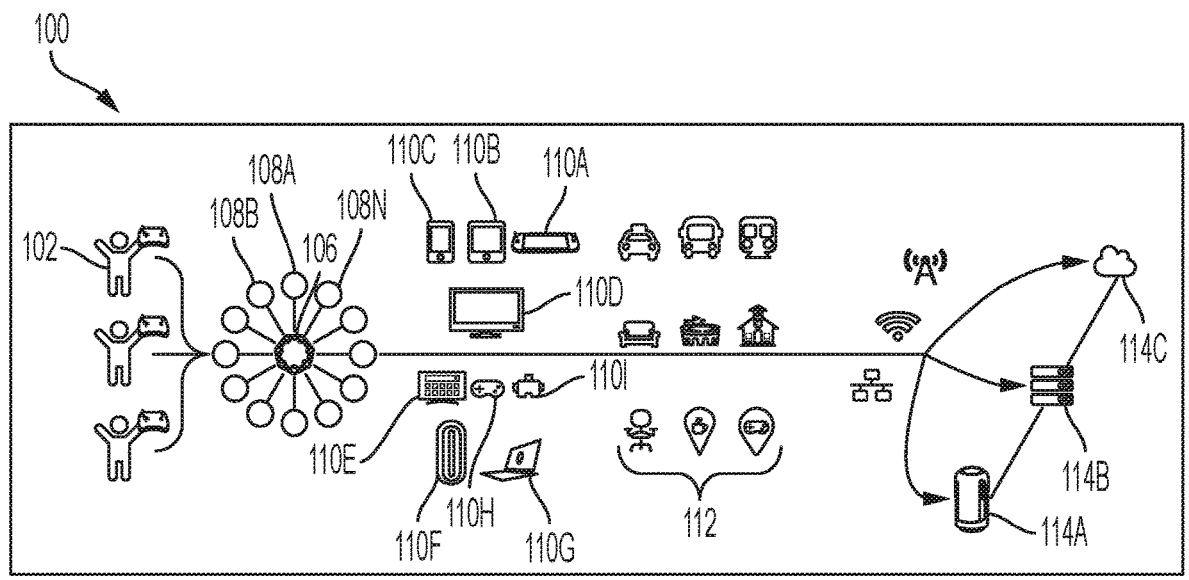
FIG. 1 is a block diagram illustrating aspects of a configurable system for providing services to users according to some embodiments of the disclosure.

These example embodiments describe and illustrate various aspects of a configurable and dynamic gaming environment that can be supported through the use of a hub device, which may be an information handling system. A hub device may be located in a user's home and used to arrange game play sessions (or more generically application sessions) between host devices and services. The host devices may execute an application for receiving an AV stream for displaying rendered content from a game play session (or other application session), and in some configurations also receive user input for interacting with the session from a peripheral device, such as a gaming controller. The AV stream presented by the host device may be generated by a service. The service may execute on the hub device or another information handling system, such as a cloud computing resource. A home may include one or several host devices (e.g., televisions, mobile computers, tablet computers, and personal computers) and may include one or several information handling systems executing the service (e.g., a hub devices and personal computers).

The user's home may be divided into different environments defined by a space around a host device. For example, a living room with a television may be one environment and a bedroom with a personal computer may be another environment. A user may use a peripheral device in one of the environments and the hub device may configure a host device, a service, and the peripheral device for operation in the environment by determining the corresponding environment using a knowledge graph. The knowledge graph provides a database of historical information about the environments from which the hub device may use current characteristics of the peripheral device to deduce the location, and thus current environment, of the peripheral device. For example, the knowledge graph may include information about location of rooms (e.g., environments) in the house based on wireless signatures of devices within the different rooms. This difference in signatures reflects that a device on a one side of the house may receive beacon signals from different neighboring access points than a device on an opposite side of the house. When a user carries the peripheral device around the house, the hub device may determine a location of the peripheral device based on visible access points to the peripheral device. Other example characteristics beyond wireless signature for determining location are described in further detail below, and the knowledge graph may be used to combine different characteristics to identify the location, and thus environment, of the peripheral device.

Based on the location of the peripheral device determined from the knowledge graph, the hub device may initialize an application session for the peripheral device by determining an appropriate host device and service for the application session. For example, if the peripheral device is in the living room and is requesting a game that is within the capabilities of the service on the hub device to execute, the hub device may initialize an application session for the peripheral device between the television as a consumption device and the hub device as a service. The service on the hub device executes the game and streams rendered content to an application executing on the television consumption device.

The hub device may be used to migrate the peripheral device to a different environment and/or migrate the application session between host devices and/or services. For example, initially the application session may use a communication link between the peripheral device and the television host device for receiving user input, in which the application executing on the television host device relays user input to the service through a backhaul communication link from the television host device to the hub device. During the application session, the hub device may monitor characteristics of the peripheral device, including signal strength of connection to other components, and determine that the communication link from the peripheral device to the hub device is stronger than the peripheral device to the television host device. The hub device may migrate the peripheral device to a communications link with the hub device such that the service executing on the hub device directly receives the user input but the streaming session continues from the service to the application executing on the television host device. Such a change is illustrated in the change in configuration from FIG. 3A to the configuration of FIG. 3B described in further detail below. As another example, the hub device may migrate an application session from a tablet host device to a television host device within the same environment if the tablet host device is disconnected from the hub device (e.g., the tablet host device is turned off).

Other aspects of the application session may also be migrated. For example, if the peripheral device is determined to move to a different environment, then the hub device may migrate the application session to an application executing on a host device within the new environment. As another example, if a connection between the television host device and the service becomes unstable, the hub device may recommend and/or initiate a migration of the application session to a different host device. One scenario for such a migration may be where the television host device is connected through a wireless link to the service in which the wireless link quality is reducing quality of the streaming and a second host device with a wired connection is available in a nearby environment. Each of these example migrations may be determined based on information in the knowledge graph regarding locations of environments and capabilities within those environments. As yet another example, a user may request execution of an application, such as a particular game, during the application session for which a better configuration exists than the current host device and/or current service. The request for a different application, such as a game requiring a certain GPU capability, may cause the hub device to determine that a second device executing a second service is better for hosting the application and migrate the peripheral device to the second service by, for example, reconfiguring network connections.

The hub device may support connecting to multiple peripheral devices. In one example, the hub device may support two peripheral devices using a shared session on one host device to play the same or different games on the host device. In another example, the hub device may support two peripheral devices in different environments using different sessions with different host devices. The hub device may determine the environment of each of the peripheral devices based on characteristics of the device and the knowledge graph and configure application session for each of the peripheral devices accordingly. Different arrangements of peripherals and players may be supported. For example, one hub device executing a service and one host device executing an application can support a configuration with Game A and one player (P1) with peripheral (C1) and Game B and one player (P2) with peripheral (C2); or can support a configuration with Game A and one player (P1) with peripheral (C1) and Game A and one player (P2) with peripheral (C2); or can support a configuration with Game A and two players (P1, P2) with peripherals (C1, C2).

The hub device may support executing sessions of multiple applications (or more generically content components) within a streaming session. The individual content components may be executed on the same host device, or may be executed on different host devices located in the same environment. The hub device may be used to migrate a content component from one host device to a different host device within the streaming session and/or determine a layout for multiple content components executed on the same host device. For example, the hub device may utilize user, content and device context to orchestrate content components across all host devices connected to the hub device to maximize the collective user experience across all users in an environment.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 is a block diagram illustrating aspects of a configurable system for providing services to users according some embodiments of the disclosure. A system 100 includes users 102 who may have access to a shared library of applications 106 including applications 108A-108N. The users 102 may have separate libraries, with some overlapping applications between the libraries. The users 102 may access the library 106 through devices 110A-I, such as mobile gaming device 110A, tablet computing device 110B, phone computing device 110C, television 110D, personal computing device 110E, desktop computing device 110F, laptop computing device 110G, game controller 110H, VR headset 110I. The devices 110 may access services at any of locations 112, including cars, busses, homes, hotels, offices, parks, etc. One or more of the devices 110 may communicate with an application session executing on a computing device 114, such as a home application hub 114A, a server 114B, or a cloud execution environment 114C. In some embodiments, environments may only exist for fixed devices, e.g., desktop computers, televisions, etc.

Figure 2:
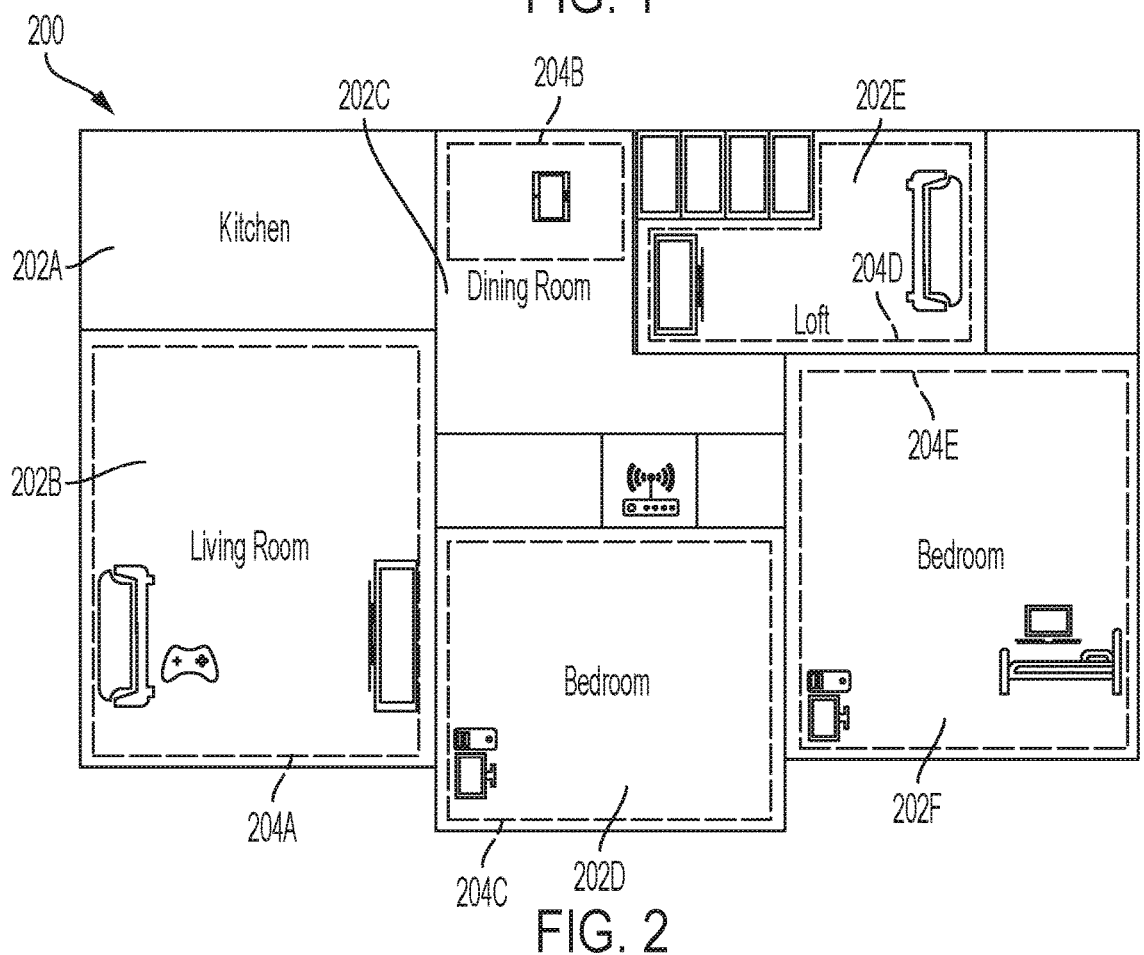
FIG. 2 is a block diagram illustrating possible game environments according to some embodiments of the disclosure.

FIG. 2 is a block diagram illustrating possible game environments according to some embodiments of the disclosure. A user's home 200 may include rooms 202A-F, and each of the rooms may have different information handling systems present, different AV equipment present, and/or different characteristics. For example, a living room 202B may include a large-size television, a bedroom 202D may include a personal computer, and a dining room 202C may include a table computing device. Gaming environments 204A-E in the home 200 may be defined based on spaces where a user is likely to execute an application session. Each gaming environment 204A-E may include numerous devices and gaming environments, devices that may or may not be capable of hosting games, and/or devices that may or may not be capable of receiving game output. A system 100 may allow multiple users in the home 200 to simultaneously execute an application session. In some embodiments, multiple games may be hosted on a single device. In some embodiments, multiple games may target a single output device. In some embodiments, solution manages where games should be hosted, where game output should go, and how to best route peripheral I/O for users.

A user may move between gaming environments 204A-E within the home 200 and continue an application session. For example, a user may take a device, such as a gaming controller, from environment 204A to environment 204C. The gaming controller may migrate and reconfigure for operation in environment 204C from a configuration for environment 204A. For example, the controller may transition from an application hosted on a TV in living room 202B to an application hosted on TV in dining room 202C while remaining connected to a host service executing on a PC in bedroom 202D.

Figure 3A:
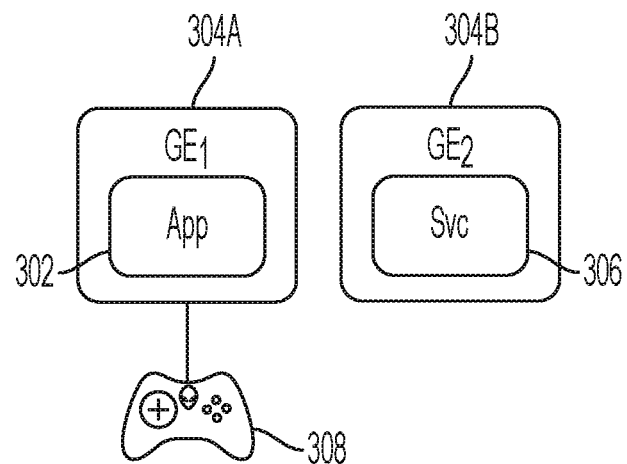
FIG. 3A is a block diagram illustrating application and services hosted in different gaming environments according to some embodiments of the disclosure.

Example configurations for applications and services in gaming environments are shown in FIGS. 3A-3D. FIG. 3A is a block diagram illustrating application and services hosted in different gaming environments according to some embodiments of the disclosure. In FIG. 3A, a first gaming environment 304A may include a device, such as a TV or PC, hosting an application 302, which is an endpoint for an application session such as a gaming session. The application 302 communicates with a service 306, which may be hosted on a device in a different gaming environment 304B. A controller 308 may communicate with the application 302 to receive user input for the application session to control, for example, a character in a game. In some embodiments, the controller 308 is connected to the environment 304A hosting the application and the I/O is configured to be relayed to the environment 304B hosting the actual game.

Figure 3B:
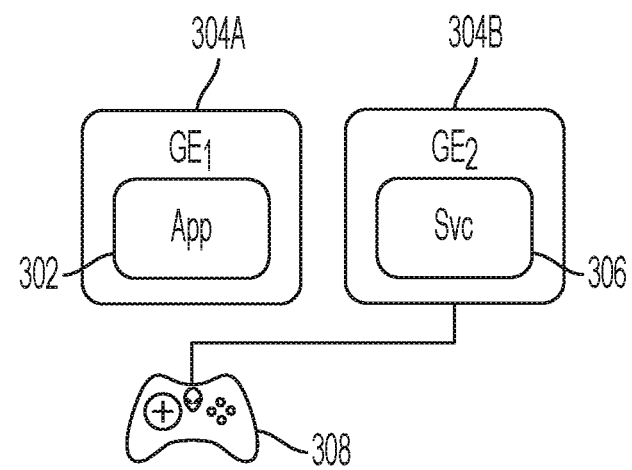
FIG. 3B is a block diagram illustrating application and services hosted in different gaming environments according to some embodiments of the disclosure.

Another arrangement for the application and service is shown in FIG. 3B. FIG. 3B is a block diagram illustrating application and services hosted in different gaming environments according to some embodiments of the disclosure. In FIG. 3B, the controller 308 communicates with the service 306 for providing user input to an application session, with the AV rendering target of the application session being application 302 in a different gaming environment.

Figure 3C:
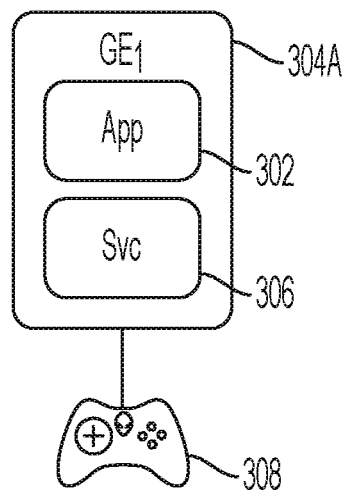
FIG. 3C is a block diagram illustrating application and service hosted in a common gaming environment according to some embodiments of the disclosure.

Another arrangement for the application and service is shown in FIG. 3C. FIG. 3C is a block diagram illustrating application and service hosted in a common gaming environment according to some embodiments of the disclosure. In FIG. 3C, the application 302 and the service 306 are executed in the same gaming environment 304A, which may be a single device, two devices, or a combination of devices in the gaming environment 304A. The controller 308 may communicate with either the service 306 and/or the application 302.

Figure 3D:
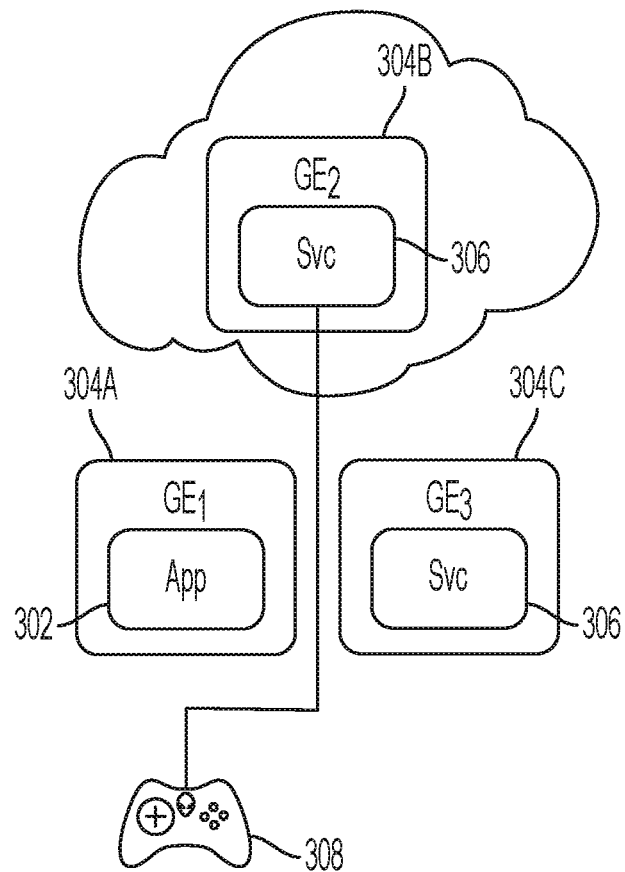
FIG. 3D is a block diagram illustrating a cloud-based service arrangement for a gaming environment according to some embodiments of the disclosure.

A further arrangement for the application and service is shown in FIG. 3D. FIG. 3D is a block diagram illustrating a cloud-based service arrangement for a gaming environment according to some embodiments of the disclosure. In FIG. 3D, the controller 308 may communicate with a service 306 hosted in a gaming environment 304B that is remote from the gaming environment 304A in which the application 302 is executing. The service 306 may be executing, for example, on a remote device, such as when the user's home includes the gaming environment 304B but the user is engaging with application 302 at a location on a different network from their home (e.g., at a friend's house). The service 306 may also or alternatively be executed, for example, on a cloud computing device available as a subscription service to the user.

Figure 4:
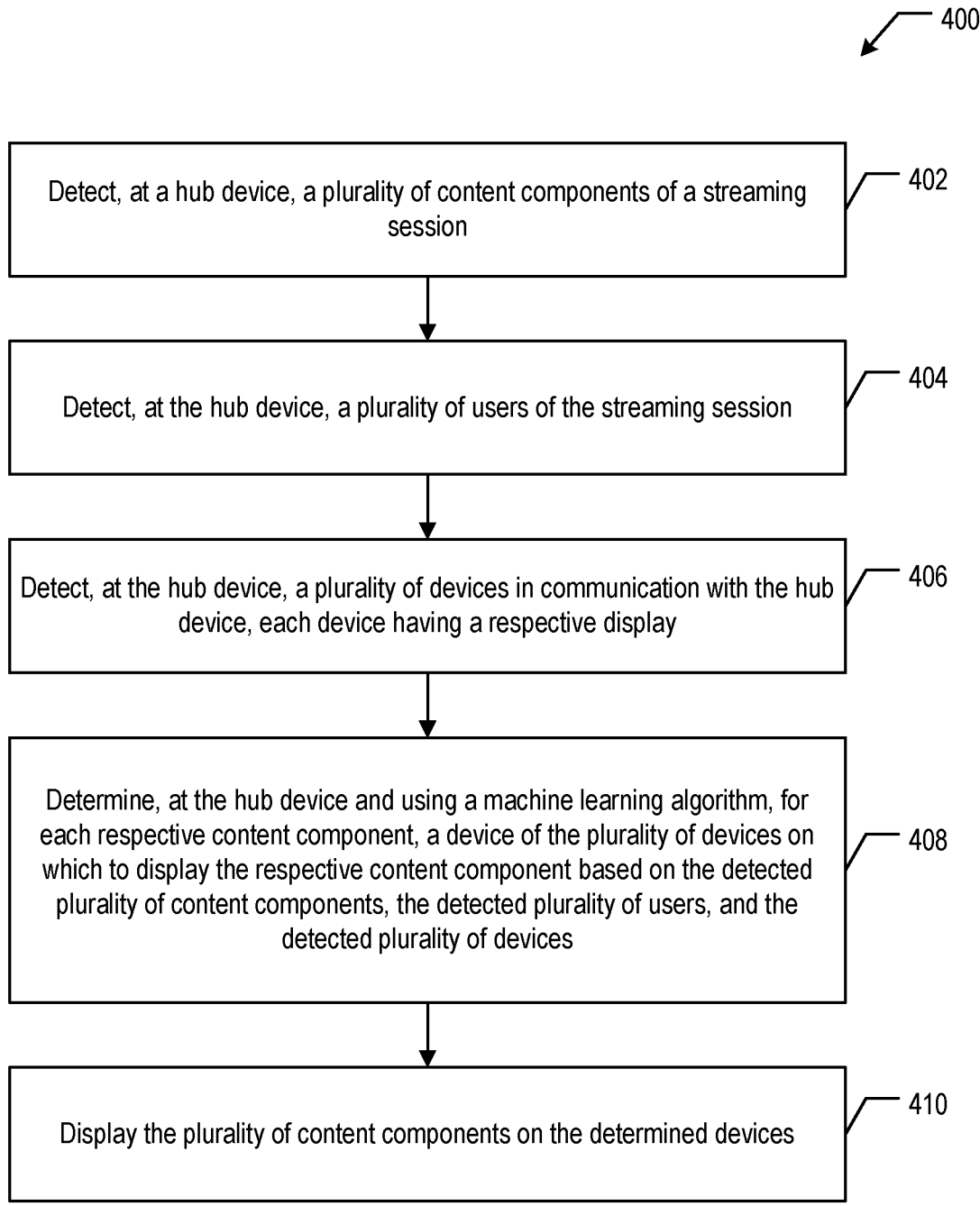
FIG. 4 is a method of determining devices on which to display various content components according to some embodiments of the disclosure.

FIG. 4 illustrates a flow chart of an example method 400 for determining devices on which to display content components of a streaming session. At block 402, multiple content components of a streaming session may be detected at a hub device (e.g., the home application hub 114A, the server 114B, or the cloud execution environment 114C). For example, the hub device may detect that the streaming session includes two separate gameplay sessions and a social media application session. At block 404, the hub device may detect multiple users associated with the streaming session. For example, the hub device may detect a first user associated with one of the gameplay sessions and a second user associated with the other gameplay session and the social media application session. At block 406, the hub device may detect multiple host devices in communication with the hub device. For example, the hub device may detect a television 110D and a tablet computing device 110B in communication with the hub device. The television 110D and the tablet computing device 110B may be located in the same environment (e.g., the environment 204A).

At block 408, the hub device may determine using a machine learning algorithm, for each respective content component, a host device on which to display the respective content component based on the detected content components, the detected users, and the detected host devices. A variety of parameters may be input to the machine learning model to provide the machine learning model with context regarding the detected content components, the detected users, and the detected host devices. For example, input parameters regarding content components may include the user(s) driving a content component, the user(s) viewing a content component, a type of content component (e.g., a game, video, web application, chat application, etc.), requirements of a content component (e.g., audio, video, quality, etc.), a preferred size of a content component, a rate of user interaction with a content component (e.g., an interaction measurement), and a rate at which a content component changes on its own (e.g., content velocity).

Example input parameters regarding users may include a location of a user, preferences of a user such as a preferred host device or preferred content component, and user interaction with a content component.

Example input parameters regarding host devices may include a location of a host device, dimensions of a host device's display, the technology of a host device's display, and capabilities of a host device's display (e.g., audio, video, lighting, etc.).

In some embodiments, the machine learning model outputs potential combinations of content components on the available host devices. For example, a first combination could be the first and second gameplay sessions executed on the television 110D and the social media application executed on the tablet computing device 110B. A second combination could be the first gameplay session executed on the television 110D and the second gameplay session and the social media application executed on the tablet computing device 110B. A third combination could be the first gameplay session and the social media application executed on the television 110D and the second gameplay session executed on the tablet computing device 110B. And a fourth combination could be the second gameplay session and the social media application executed on the television 110D and the first gameplay session executed on the tablet computing device 110B. In some aspects, the potential combinations include potential layouts of content components when a single host device executes more than one content component in a particular combination.

In such embodiments, the potential combinations output by the machine learning model may then be sorted by confidence. In various aspects, suitable configuration rules (e.g., user preferences) may be applied to the sorted potential combinations. For example, suitable configuration rules may include certain host devices being restricted from executing one or more content components, certain content components being restricted from execution (e.g., parental restrictions), and a host device being specified for a particular user. The configuration rules may override the potential combinations output by the machine learning model. For example, the potential combination with the highest confidence may be the first combination above, but a configuration rule requires the television 110D be reserved only for the second user. As such, in this example, the fourth combination. At block 410, the hub device may display the content components on the determined host devices. For example, given that the fourth combination is selected, the hub device may execute the second gameplay session and the social media application on the television 110D and the first gameplay session on the tablet computing device 110B.

Figure 5A:
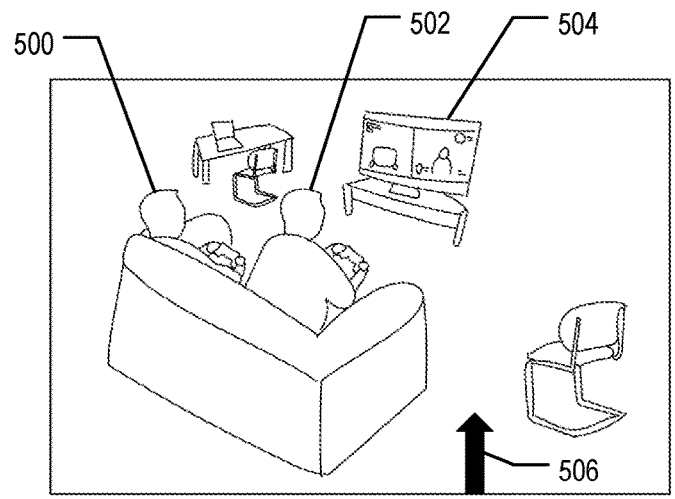
FIGS. 5A to 5E are representations of exemplary usage scenarios for adjusting how content components are displayed on devices connected to an application session according to some embodiments of the disclosure.

In some instances, changes may occur within an environment that may result in the hub device adjusting the host devices on which the content components are executed and/or the layout of content components on a particular host device. FIGS. 5A to 5E illustrate representations of exemplary scenarios that may result in such adjustments by the hub device. In a first example, FIG. 5A illustrates a user 500 and a user 502 playing a game on a television 504 and a user 506 entering the environment (indicated by an arrow). As illustrated, a first gameplay session driven by the user 500 and a second gameplay session driven by the user 502 are both displayed in a split screen layout on the television 504. Upon the hub device detecting the user 506 (e.g., the user 506 turning on a game controller), the hub device may determine whether to execute a third gameplay session on the television 504 or to require an additional host device be brought to the environment for executing the third gameplay session.

Figure 5B:
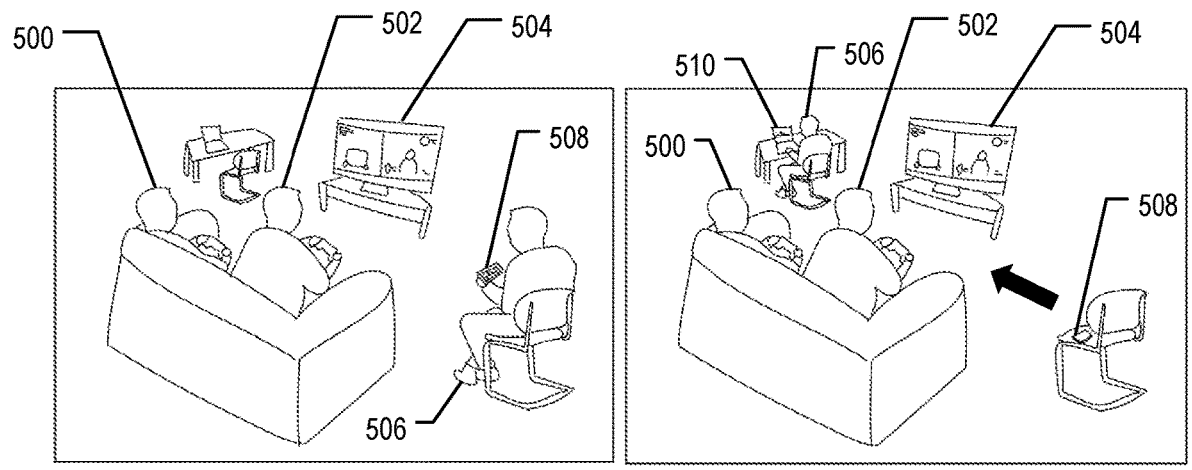

In another example, FIG. 5B illustrates the user 506 playing the game on a phone computing device 508. Stated differently, the third gameplay session driven by the user 506 is executed on the phone computing device 508. The user 506 is shown moving from the phone computing device 508 to the laptop computing device 510. In response to detecting the move, the hub device may migrate the third gameplay session from the phone computing device 508 to the laptop computing device 510. In this example, because the phone computing device 508 remains within the environment, the phone computing device 508 may be included in potential combinations output by the machine learning model.

Figure 5C:
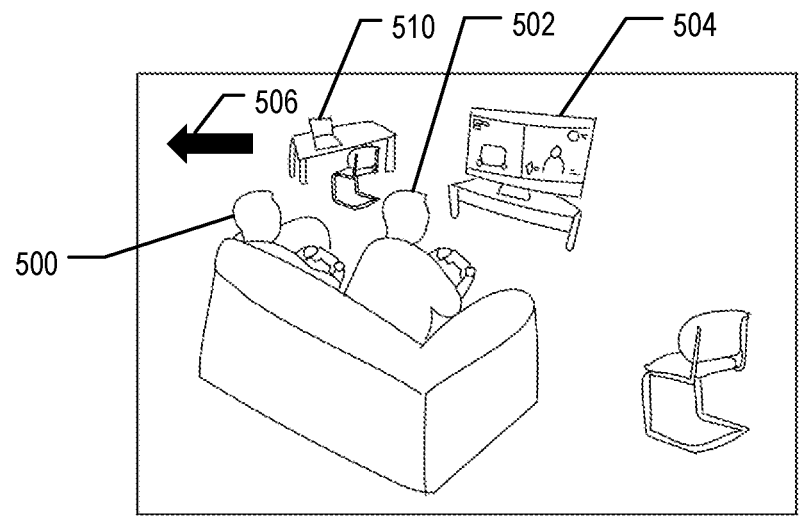

In another example, FIG. 5C illustrates the user 506 leaving the environment (as indicated by the arrow) with the phone computing device 508. If the user 506 input a command to end the third gameplay session, the hub device may terminate the third gameplay session. If instead the user 506 desires to continue playing, the hub device may migrate the third gameplay session to the phone computing device 508. In this example, because the laptop computing device 510 remains within the environment, the laptop computing device 510 may be included in potential combinations output by the machine learning model. It may be that the machine learning model outputs a combination in which the third gameplay session is executed on the laptop computing device 510 with a higher confidence than a combination in which the third gameplay session is executed on the phone computing device 508. A preference of the user 506 to use the phone computing device 508, however, may override the machine learning model output.

Figure 5D:
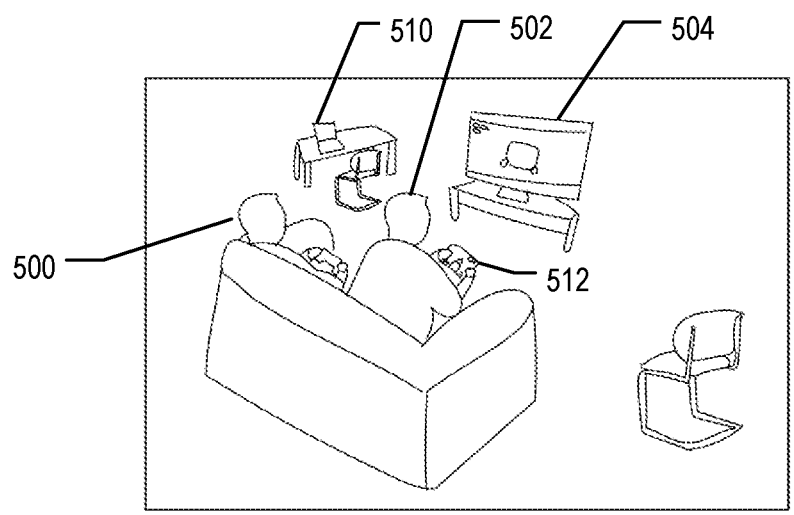

In yet another example, FIG. 5D illustrates a scenario in which the user 502 brings out a tablet computing device 512. In response to detecting the tablet computing device 512, the hub device may migrate the second gameplay session to the tablet computing device 512. For instance, a user preference may be to have a gameplay session migrated to the tablet computing device 512 when turned on. With the second gameplay session migrated to the tablet computing device 512, the hub device may adjust the layout of the first gameplay session to fill the entire display of the television 504, as illustrated.

Figure 5E:
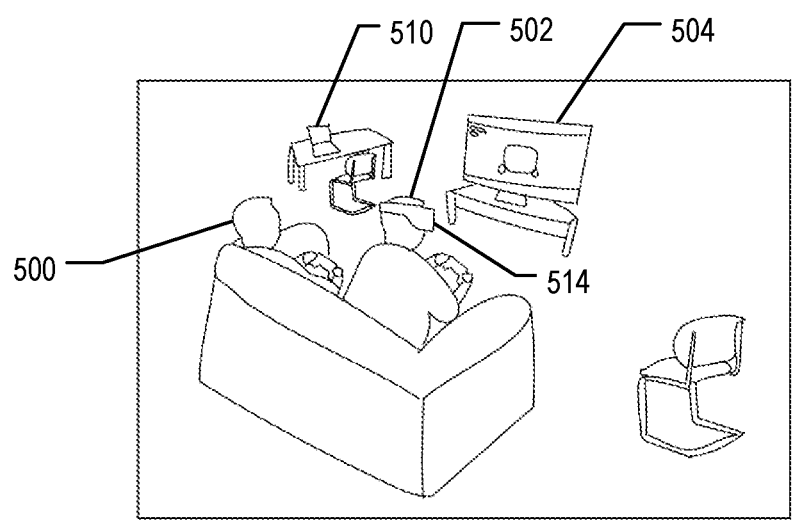

In another example still, FIG. 5E illustrates a scenario in which the user 502 brings out a virtual reality headset 514. In response to detecting the virtual reality headset 514, the hub device may migrate the second gameplay session to the virtual reality headset 514. For instance, a user preference may be to have a gameplay session migrated to the virtual reality headset 514 when turned on.

It will be appreciated that the exemplary scenarios of FIGS. 5A to 5D are not exhaustive and many other scenarios may cause the hub device to adjust the host devices on which the content components are displayed and/or the layout of content components on a host device. For example, other exemplary scenarios may include a user changing (e.g., adding, removing, re-sizing) the content components they are viewing on a host device, a host device losing connection (e.g., the battery dying), and a content component receiving activity and swapping with a foreground component (e.g., a user receiving a text in a chat application).

Figure 6A:
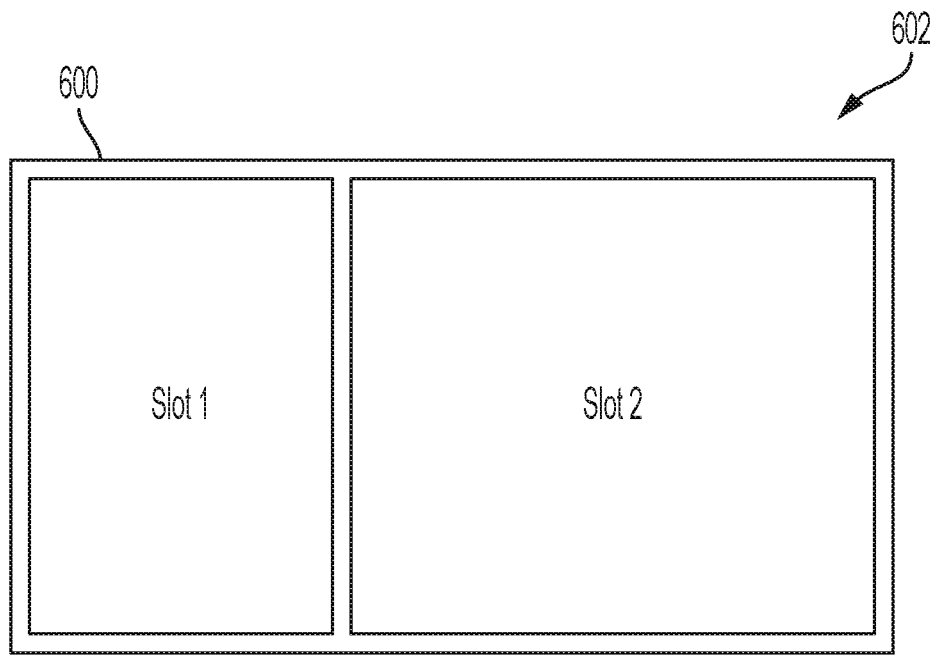
FIGS. 6A and 6B are example content component layouts according to some embodiments of the disclosure.
Figure 6B:
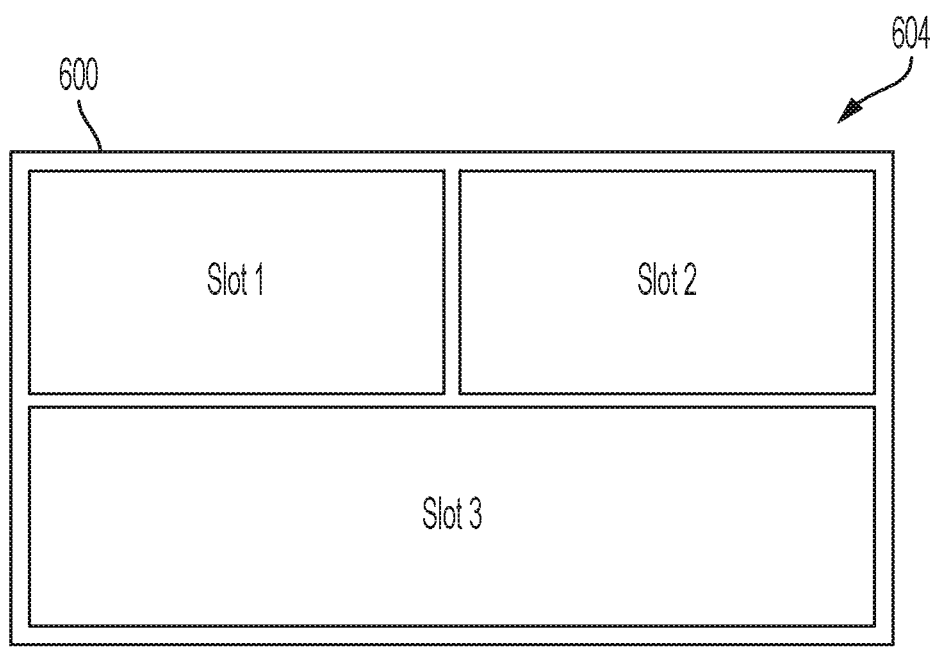

As stated above, the machine learning model may output potential layouts of content components when a single host device executes more than one content component in a particular combination. FIG. 6A illustrates an example layout 602 for two content components displayed on a display 600. The first content component may be placed in "Slot 1" and the second content component may be placed in "Slot 2" of the layout 602. FIG. 6B illustrates an example layout 604 for three content components displayed on a display 600. The first content component may be placed in "Slot 1", the second content component may be placed in "Slot 2", and the third content component may be placed in "Slot 3" of the layout 604. The example layouts 602 and 604 are merely exemplary and many other suitable layouts for two and three content components, as well as four or more content components, are contemplated.

The machine learning model may consider how content components interact with one another when outputting potential combinations and the confidence scores of those combinations. For example, a web browser application showing a game guide may preferably be displayed next to the game application it is for.

In some embodiments, the layouts output by the machine learning model may include swappable content components. Stated differently, if the same host device is considered in multiple layouts with two or more content components that overlap (e.g., placed in the same slot), then those content components may be marked as swappable. For example, a first content component and a second content components may be stacked in the same position on a display such that the first content component overlaps the second content component and is marked as swappable. A user may initiate an action (e.g., press a button included in a user interface) that causes the two stacked content components to swap positions such that the second content component overlaps the first content component.

In various embodiments, user actions may be monitored (e.g., by the hub device) after the content components are rendered on the host devices (e.g., after block 410). The monitored user actions may be used to improve the machine learning model's future outputs. For example, if a user moves a content component back to its original location after the hub device moves the content component to a different location, then that feedback can update user preferences.

Figure 7A:
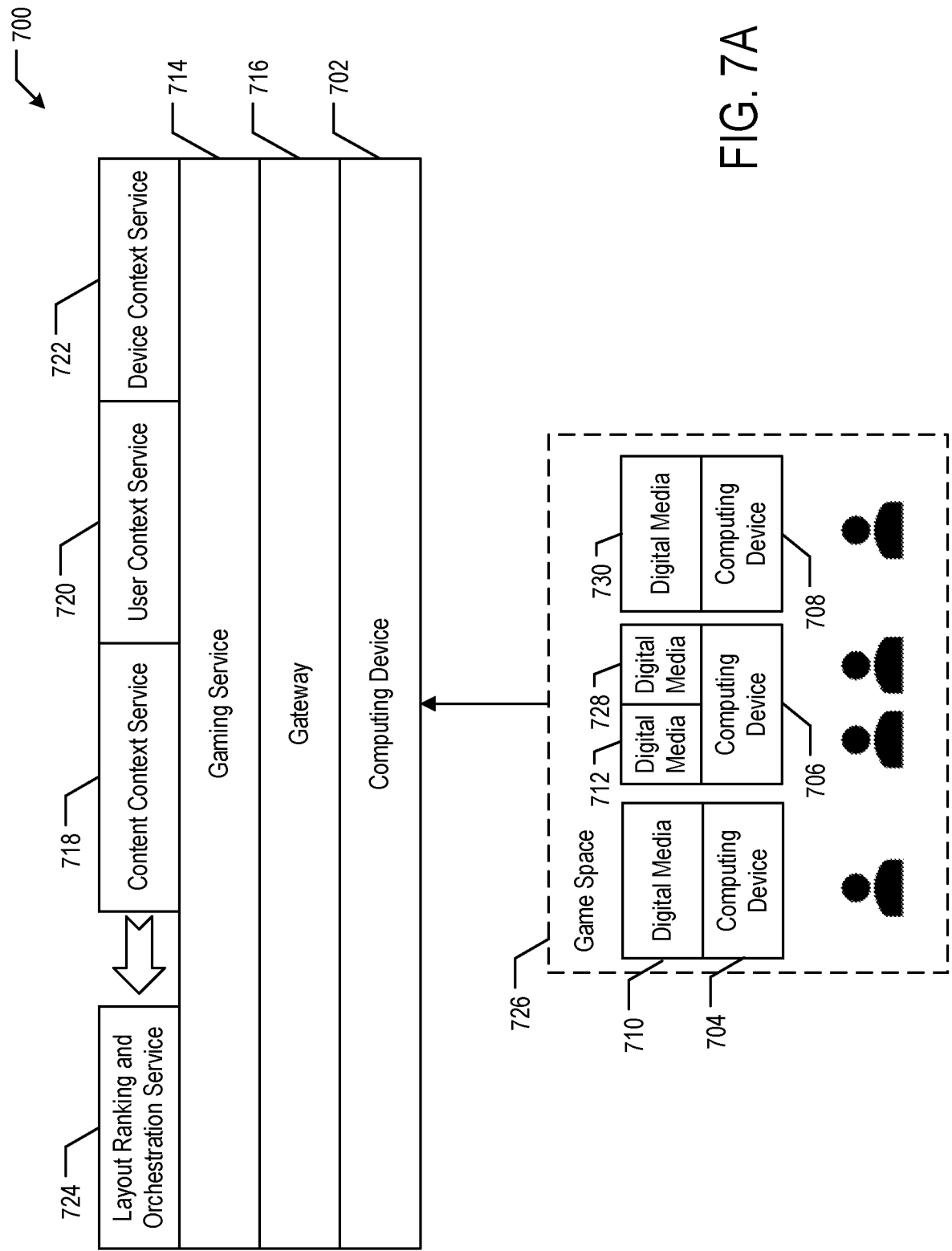
FIG. 7A shows a system for orchestrating layouts of content components across host devices according to some embodiments of the disclosure.

FIG. 7A depicts a system 700 according to an exemplary embodiment of the present disclosure. The system 700 may be configured to orchestrate layouts of content components across host devices, such as content components executed on host devices associated with users in a game space 726.

The system 700 includes a computing device 702 (e.g., a server), which may be configured to determine host devices on which to display content components and/or layouts of content components displayed on a host device. In particular, the game space 726 includes the computing devices 704, 706, and 708. The game space 726 may be an exemplary implementation of the environments 204A-C and/or the rooms 202A-E. The computing devices 704, 706, and 708 may include one or more gaming consoles, laptop computers, smartphones, smart home speakers, smart home devices, gaming devices such as controllers, and/or any other type of computing device (e.g., personal computing device, professional computing device).

The computing devices 704, 706, and 708 may display digital media 710, 712, 728, and 730 in the game space 726. The digital media 710, 712, 728, and 730 may include various content components, such as a gaming application or other applications (e.g., web browsing application, chat application, social media application, etc.). For example, the digital media 710 may be a video application associated with a first user, the digital media 712 may be a first gaming application session associated with a second user, the digital media 728 may be a second gaming application session associated with a third user, and the digital media 730 may be a third gaming application session associated with a fourth user. As shown, the computing device 704 displays the digital media 710, the computing device 706 displays both the digital media 712 and the digital media 728, and the computing device 730 displays the digital media 730.

In various instances, users in the game space 726 may initiate or terminate applications in the digital media 710, 712, 728, 730, users may enter or exit the game space 726 with a computing device, and/or users may migrate digital media between computing devices 704, 706, 708 within the game space 726. The computing device 702 may be configured to detect the digital media 710, 712, 728, 730 streaming in the game space 726, the users in the game space 726, and the computing devices 704, 706, 708 and the game space 726, and determine on which computing devices 704, 706, 708 each of the content components of the digital media 710, 712, 728, 730 should be displayed. The computing device 702 may also be configured to determine a layout of content components of digital media 710, 712, 728, 730 displayed on a single computing device 704, 706, 708.

The computing device 702 may include a gateway 716 and the gaming service 714. The gateway 716 may be responsible for network communication and other services. For example, the computing device 702 may be an orchestrator or other computing device for a distributed computing environment, and the gateway 716 may coordinate communication with the computing devices in the distributed computing environment. The gateway 716 may further implement a gaming service 714 which may provide one or more gaming services to requesting computing devices 704, 706, and 708. In certain implementations, the gaming service 714 may be configured to detect the digital media 710, 712, 728, 730 streaming in the game space 726, the users in the game space 726, and the computing devices 704, 706, 708 and the game space 726, and determine on which computing devices 704, 706, 708 each of the content components of the digital media 710, 712, 728, 730 should be displayed. The gaming service 714 may also be configured to determine a layout of content components of digital media 710, 712, 728, 730 displayed on a single computing device 704, 706, 708. Accordingly, the gaming service 714 may include a content context service 718, a user context service 720, a device context service 722, and a layout ranking and orchestration service 724.

The operations of the computing device 702 and in particular of the content context service 718, user context service 720, device context service 722, and layout ranking and orchestration service 724 are described in greater detail above in connection with FIG. 4. For example, the content context service 718 may be configured to detect content components streaming in the game space 726 (e.g., block 402). The user context service 720 may be configured to detect users in the game space 726 (e.g., block 404). The device context service 722 may be configured to detect computing devices in the game space 726 (e.g., block 406). The layout ranking and orchestration service 724 may be configured to determine for each respective content component detected, a computing device on which to display the respective content component (e.g., block 408). The layout ranking and orchestration service 724 may also be configured to determine a layout for content components displayed on a particular computing device.

Figure 7B:
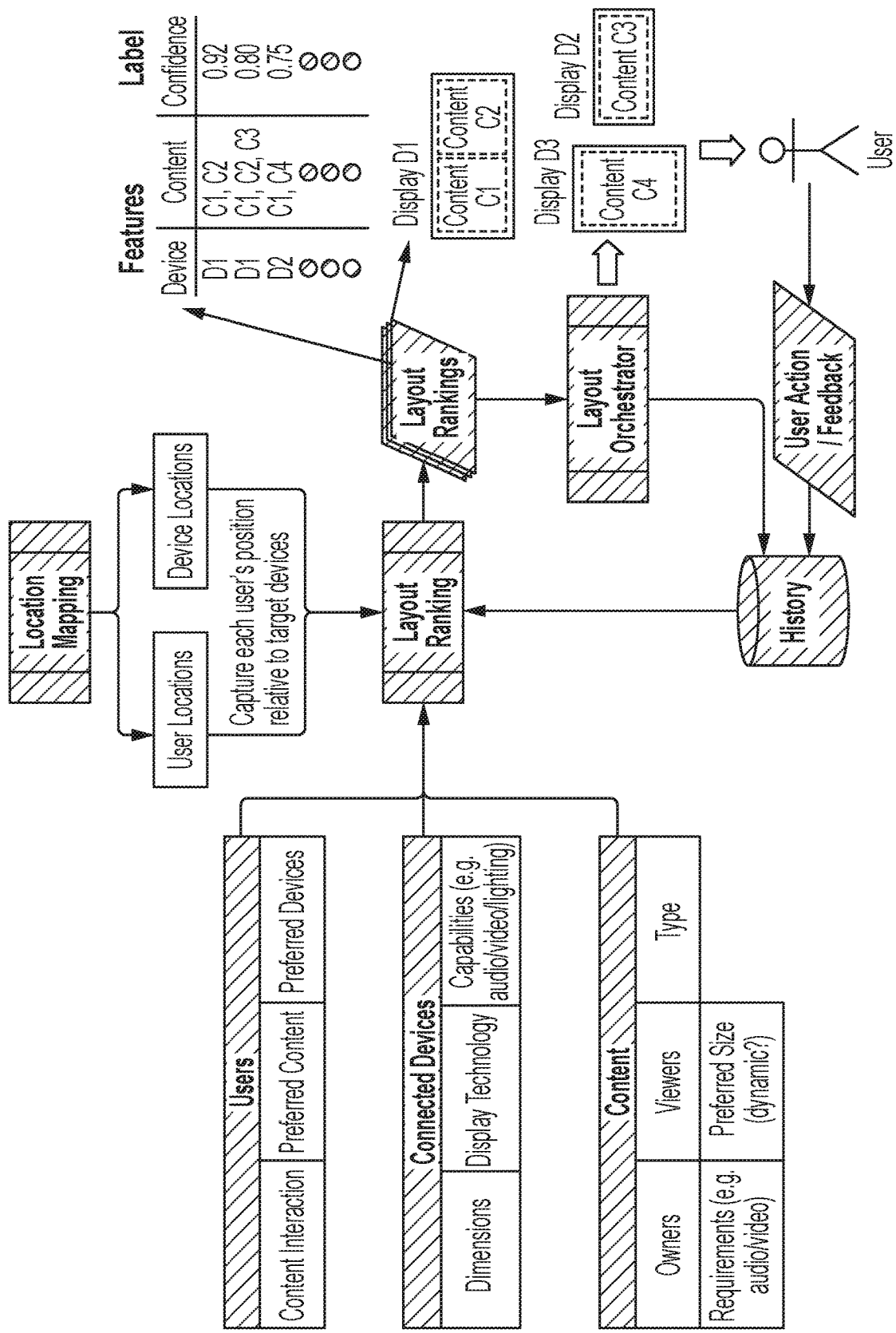
FIG. 7B shows an example methodology for determining a layout configuration of content components across host devices according to some embodiments of the disclosure.

A methodology showing inputs and outputs for a layout orchestrator service, e.g., service 724 are shown in FIG. 7B. FIG. 7B shows an example methodology for determining a layout configuration of content components across host devices according to some embodiments of the disclosure. The layout orchestrator may receive layout rankings determined according to a machine learning algorithm that matches devices with content, with each pairing having a determined confidence level. The layout rankings are evaluated based on information about location, users, connected devices, content, and historical data from previous layouts and user feedback about the layout.

Figure 8:
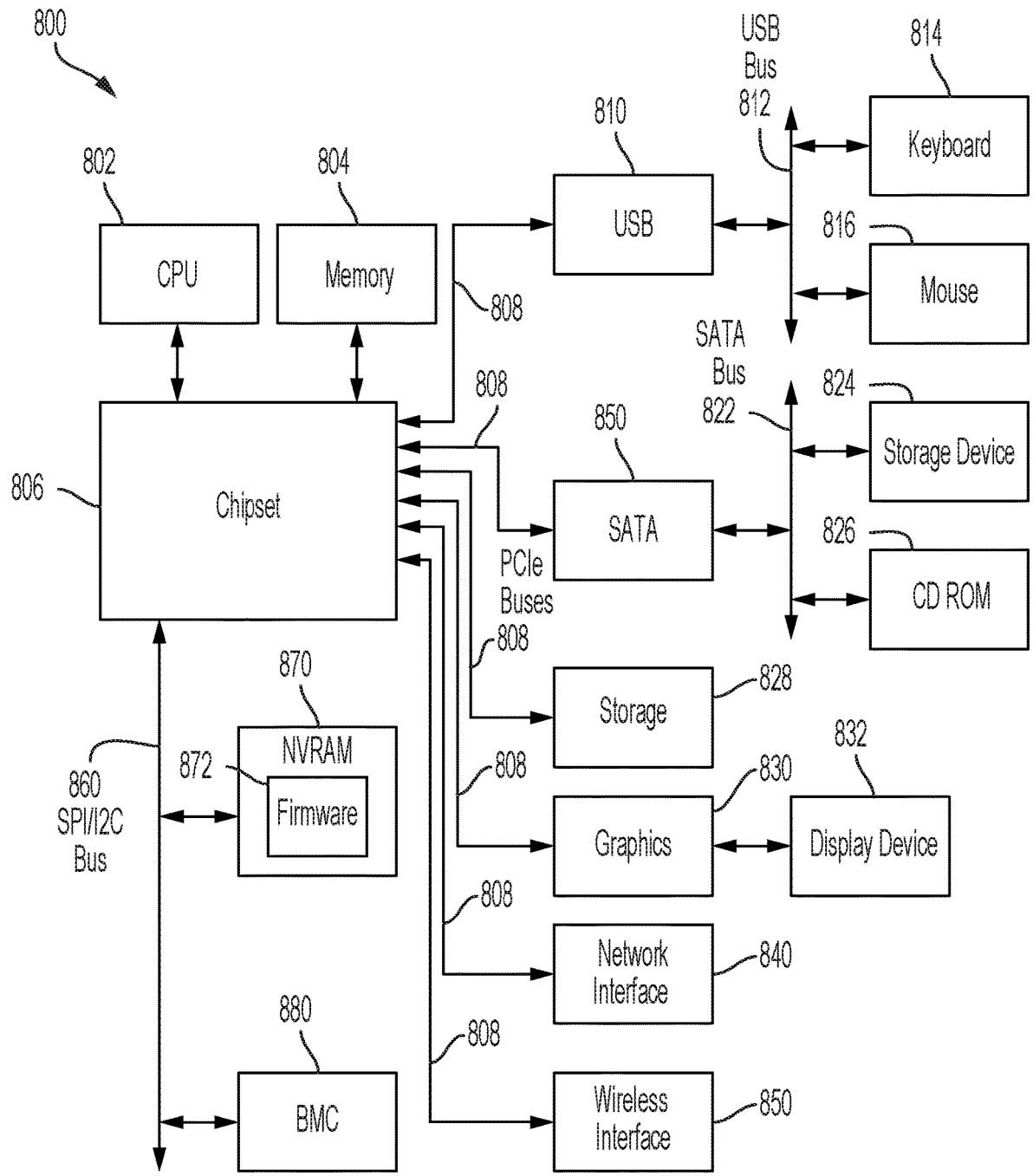
FIG. 8 is a schematic block diagram of an example information handling system according to some embodiments of the disclosure.

FIG. 8 illustrates an example information handling system 800. Information handling system 800 may include a processor 802 (e.g., a central processing unit (CPU)), a memory (e.g., a dynamic random-access memory (DRAM)) 804, and a chipset 806. In some embodiments, one or more of the processor 802, the memory 804, and the chipset 806 may be included on a motherboard (also referred to as a mainboard), which is a printed circuit board (PCB) with embedded conductors organized as transmission lines between the processor 802, the memory 804, the chipset 806, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 802, the memory 804, the chipset 806, and/or other components may be organized as a System on Chip (SoC).

The processor 802 may execute program code by accessing instructions loaded into memory 804 from a storage device, executing the instructions to operate on data also loaded into memory 804 from a storage device, and generate output data that is stored back into memory 804 or sent to another component. The processor 802 may include processing cores capable of implementing any of a variety of instruction set architectures (ISAs), such as the x86, POW- ERPC®, ARM®, SPARC®, or MIPS® ISAs, or any other suitable ISA. In multi-processor systems, each of the processors 802 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 806 may facilitate the transfer of data between the processor 802, the memory 804, and other components. In some embodiments, chipset 806 may include two or more integrated circuits (ICs), such as a northbridge controller coupled to the processor 802, the memory 804, and a southbridge controller, with the southbridge controller coupled to the other components such as USB 810, SATA 820, and PCIe buses 808. The chipset 806 may couple to other components through one or more PCIe buses 808.

Some components may be coupled to one bus line of the PCIe buses 808, whereas some components may be coupled to more than one bus line of the PCIe buses 808. One example component is a universal serial bus (USB) controller 810, which interfaces the chipset 806 to a USB bus 812. A USB bus 812 may couple input/output components such as a keyboard 814 and a mouse 816, but also other components such as USB flash drives, or another information handling system. Another example component is a SATA bus controller 820, which couples the chipset 806 to a SATA bus 822. The SATA bus 822 may facilitate efficient transfer of data between the chipset 806 and components coupled to the chipset 806 and a storage device 824 (e.g., a hard disk drive (HDD) or solid-state disk drive (SDD)) and/or a compact disc read-only memory (CD-ROM) 826. The PCIe bus 808 may also couple the chipset 806 directly to a storage device 828 (e.g., a solid-state disk drive (SDD)). A further example of an example component is a graphics device 830 (e.g., a graphics processing unit (GPU)) for generating output to a display device 832, a network interface controller (NIC) 840, and/or a wireless interface 850 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 806 may also be coupled to a serial peripheral interface (SPI) and/or Inter-Integrated Circuit (I2C) bus 860, which couples the chipset 806 to system management components. For example, a non-volatile random-access memory (NVRAM) 870 for storing firmware 872 may be coupled to the bus 860. As another example, a controller, such as a baseboard management controller (BMC) 880, may be coupled to the chipset 806 through the bus 860. BMC 880 may be referred to as a service processor or embedded controller (EC). Capabilities and functions provided by BMC 880 may vary considerably based on the type of information handling system. For example, the term baseboard management system may be used to describe an embedded processor included at a server, while an embedded controller may be found in a consumer-level device. As disclosed herein, BMC 880 represents a processing device different from processor 802, which provides various management functions for information handling system 800. For example, an embedded controller may be responsible for power management, cooling management, and the like. An embedded controller included at a data storage system may be referred to as a storage enclosure processor or a chassis processor.

System 800 may include additional processors that are configured to provide localized or specific control functions, such as a battery management controller. Bus 860 can include one or more busses, including a Serial Peripheral Interface (SPI) bus, an Inter-Integrated Circuit (I2C) bus, a system management bus (SMBUS), a power management bus (PMBUS), or the like. BMC 880 may be configured to provide out-of-band access to devices at information handling system 800. Out-of-band access in the context of the bus 860 may refer to operations performed prior to execution of firmware 872 by processor 802 to initialize operation of system 800.

Firmware 872 may include instructions executable by processor 102 to initialize and test the hardware components of system 800. For example, the instructions may cause the processor 802 to execute a power-on self-test (POST). The instructions may further cause the processor 802 to load a boot loader or an operating system (OS) from a mass storage device. Firmware 872 additionally may provide an abstraction layer for the hardware, such as a consistent way for application programs and operating systems to interact with the keyboard, display, and other input/output devices. When power is first applied to information handling system 800, the system may begin a sequence of initialization procedures, such as a boot procedure or a secure boot procedure. During the initialization sequence, also referred to as a boot sequence, components of system 800 may be configured and enabled for operation and device drivers may be installed. Device drivers may provide an interface through which other components of the system 800 can communicate with a corresponding device. The firmware 872 may include a basic input-output system (BIOS) and/or include a unified extensible firmware interface (UEFI). Firmware 872 may also include one or more firmware modules of the information handling system. Additionally, configuration settings for the firmware 872 and firmware of the information handling system 800 may be stored in the NVRAM 870. NVRAM 870 may, for example, be a non-volatile firmware memory of the information handling system 800 and may store a firmware memory map namespace 800 of the information handling system. NVRAM 870 may further store one or more container-specific firmware memory map namespaces for one or more containers concurrently executed by the information handling system.

Information handling system 800 may include additional components and additional busses, not shown for clarity. For example, system 800 may include multiple processor cores (either within processor 802 or separately coupled to the chipset 806 or through the PCIe buses 808), audio devices (such as may be coupled to the chipset 806 through one of the PCIe busses 808), or the like. While a particular arrangement of bus technologies and interconnections is illustrated for the purpose of example, one of skill will appreciate that the techniques disclosed herein are applicable to other system architectures. System 800 may include multiple processors and/or redundant bus controllers. In some embodiments, one or more components may be integrated together in an integrated circuit (IC), which is circuitry built on a common substrate. For example, portions of chipset 806 can be integrated within processor 802. Additional components of information handling system 800 may include one or more storage devices that may store machine-executable code, one or more communications ports for communicating with external devices, and various input and output (I/O) devices, such as a keyboard, a mouse, and a video display.

In some embodiments, processor 802 may include multiple processors, such as multiple processing cores for parallel processing by the information handling system 800. For example, the information handling system 800 may include a server comprising multiple processors for parallel processing. In some embodiments, the information handling system 800 may support virtual machine (VM) operation, with multiple virtualized instances of one or more operating systems executed in parallel by the information handling system 800. For example, resources, such as processors or processing cores of the information handling system may be assigned to multiple containerized instances of one or more operating systems of the information handling system 800 executed in parallel. A container may, for example, be a virtual machine executed by the information handling system 800 for execution of an instance of an operating system by the information handling system 800. Thus, for example, multiple users may remotely connect to the information handling system 800, such as in a cloud computing configuration, to utilize resources of the information handling system 800, such as memory, processors, and other hardware, firmware, and software capabilities of the information handling system 800. Parallel execution of multiple containers by the information handling system 800 may allow the information handling system 800 to execute tasks for multiple users in parallel secure virtual environments.

The schematic or flow chart diagrams of FIG. 4 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Machine learning models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a relationship between an influencing attribute, such as received device data, and a system, such as an environment or particular user, and/or a degree to which such an influencing attribute affects the outcome of such a system or determination of environment.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   detecting, at a hub device, a plurality of content components of a streaming session;
   detecting, at the hub device, a plurality of users of the streaming session;
   detecting, at the hub device, a plurality of devices in communication with the hub device, each device having a respective display;
   determining, at the hub device and using a machine learning algorithm, for each respective content component, a device of the plurality of devices on which to display the respective content component based on the detected plurality of content components, the detected plurality of users, and the detected plurality of devices; and displaying the plurality of content components on the determined devices.

2. The method of claim 1, wherein each device displays all of the plurality of content components.

3. The method of claim 1, wherein a first device displays a first content component and a second content component, and wherein a second device displays the first content component but not the second content component.

4. The method of claim 3, wherein the first device is associated with a first user, and the second device is associated with a second user.

5. The method of claim 1, wherein a first device displays a first content component and a second content component, the method further comprising determining a layout of the first and second content components on the display of the first device.

6. The method of claim 1, further comprising:
detecting, at the hub device, a new user joining the streaming session subsequent to displaying the plurality of content components on the determined devices; and
adjusting, at the hub device, the devices on which the plurality of content components is displayed.

7. The method of claim 1, further comprising:
detecting, at the hub device, a new device connected to the streaming session subsequent to displaying the plurality of content components on the determined devices; and
adjusting, at the hub device, the devices on which the plurality of content components is displayed.

8. The method of claim 1, further comprising:
detecting, at the hub device, a device of the plurality of devices becoming disconnected from the streaming session subsequent to displaying the plurality of content components on the determined devices; and
adjusting, at the hub device, the devices on which the plurality of content components is displayed.

9. The method of claim 1, wherein a first content component and a second content component are determined to be displayed on the display of a first device, and wherein the first content component is displayed overlapping the second content component.

10. The method of claim 9, further comprising, in response to a user command, swapping the first and second content components such that the second content component is displayed overlapping the first content component.

11. An information handling system, comprising:
a memory;
a processor coupled to the memory, wherein the processor is configured to perform steps comprising:
detecting, at a hub device, a plurality of content components of an streaming session;
detecting, at the hub device, a plurality of users of the streaming session;
detecting, at the hub device, a plurality of devices in communication with the hub device, each device having a respective display;
determining, at the hub device and using a machine learning algorithm, for each respective content component, a device of the plurality of devices on which to display the respective content component based on the detected plurality of content components, the detected plurality of users, and the detected plurality of devices; and
displaying the plurality of content components on the determined devices.

12. The information handling system of claim 11, wherein each device displays all of the plurality of content components.

13. The information handling system of claim 11, wherein a first device displays a first content component and a second content component, and wherein a second device displays the first content component but not the second content component.

14. The information handling system of claim 13, wherein the first device is associated with a first user, and the second device is associated with a second user.

15. The information handling system of claim 11, wherein a first device displays a first content component and a second content component, the steps further comprising determining a layout of the first and second content components on the display of the first device.

16. The information handling system of claim 11, further comprising:
detecting, at the hub device, a new user joining the streaming session subsequent to displaying the plurality of content components on the determined devices; and
adjusting, at the hub device, the devices on which the plurality of content components is displayed.

17. The information handling system of claim 11, further comprising:
detecting, at the hub device, a new device connected to the streaming session subsequent to displaying the plurality of content components on the determined devices; and
adjusting, at the hub device, the devices on which the plurality of content components is displayed.

18. A computer program product, comprising:
a non-transitory computer readable medium comprising code for performing steps comprising:
detecting, at a hub device, a plurality of content components of an streaming session;
detecting, at the hub device, a plurality of users of the streaming session;
detecting, at the hub device, a plurality of devices in communication with the hub device, each device having a respective display;
determining, at the hub device and using a machine learning algorithm, for each respective content component, a device of the plurality of devices on which to display the respective content component based on the detected plurality of content components, the detected plurality of users, and the detected plurality of devices; and
displaying the plurality of content components on the determined devices.

19. The computer program product of claim 18, wherein the medium further comprises code for performing steps comprising:
detecting, at the hub device, a new user joining the streaming session subsequent to displaying the plurality of content components on the determined devices; and
adjusting, at the hub device, the devices on which the plurality of content components is displayed.

20. The computer program product of claim 18, wherein the medium further comprises code for performing steps comprising:
detecting, at the hub device, a new device connected to the streaming session subsequent to displaying the plurality of content components on the determined devices; and adjusting, at the hub device, the devices on which the plurality of content components is displayed.

* * * * *